A. G. DEMAREST.
KITCHEN SINK COVER.
APPLICATION FILED OCT. 23, 1908.

914,120.  Patented Mar. 2, 1909.

WITNESSES

INVENTOR
Adam Giffen Demarest
BY
ATTORNEYS

UNITED STATES PATENT OFFICE.

ADAM GIFFEN DEMAREST, OF NEW YORK, N. Y.

KITCHEN-SINK COVER.

No. 914,120.  Specification of Letters Patent.  Patented March 2, 1909.

Application filed October 23, 1908. Serial No. 459,115.

*To all whom it may concern:*

Be it known that I, ADAM GIFFEN DEMAREST, a citizen of the United States, and a resident of the city of New York, borough of Manhattan, in the county and State of New York, have invented a new and .Improved Kitchen-Sink Cover, of which the following is a full, clear, and exact description.

My invention relates to covers used upon sinks for the purpose of temporarily serving as shelves in order to support dishes and the like, my more particular purpose being to produce a type of sink cover suitable for use in the kitchen and provided with openings of special form through which hot and cold water may pass from the spigots, and further provided with smaller openings for facilitating the drainage of such water as may be accidentally spilled upon the sink cover.

Reference is to be had to the accompanying drawings forming a part of this specification, in which similar characters of reference indicate corresponding parts in both the figures.

Figure 1:
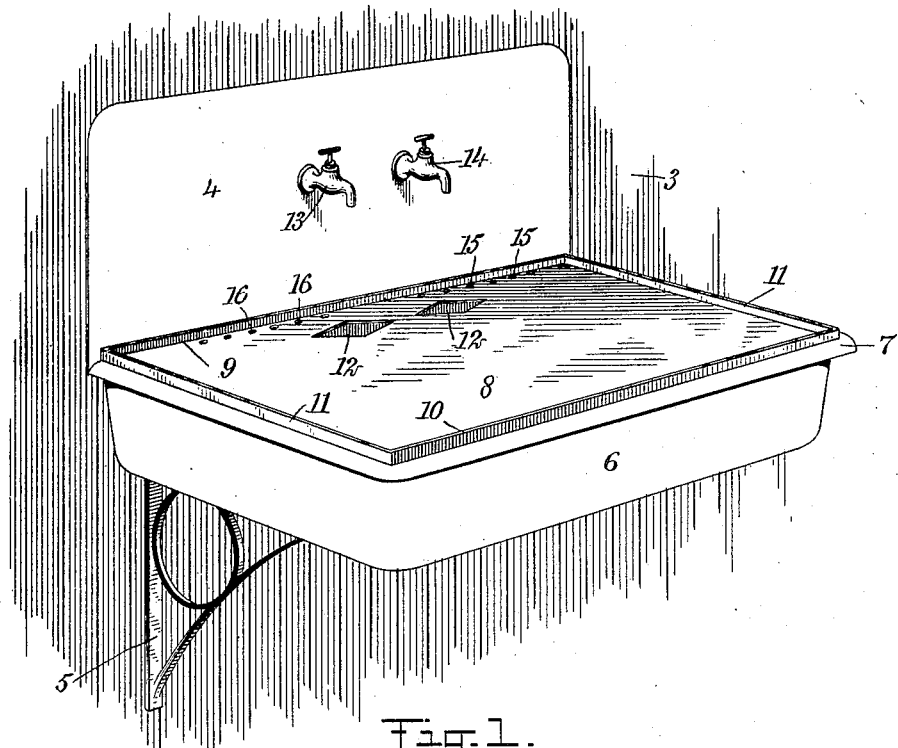
Figure 2:
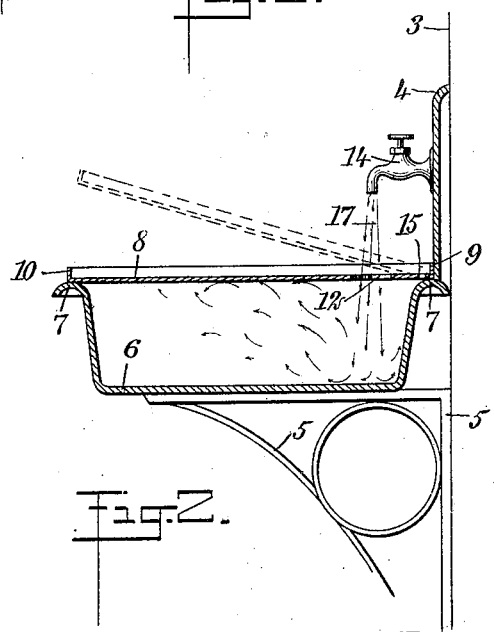

Figure 1 is a perspective showing my improved sink cover as mounted upon a sink and ready for use; and Fig. 2 is a vertical cross section through the same.

Mounted upon a wall 3 is a splash board 4, and disposed below the latter are brackets 5. Mounted upon these brackets is the sink basin 6, provided with flanges 7 turned outwardly. My sink cover is made preferably of sheet metal, as shown, and consists of a bottom panel 8, side panels 9, 10 and end panels 11. The bottom panel is provided with two openings 12 and the latter are placed directly under two spigots 13, 14, arranged in the usual manner for kitchen use. The panel 8 is further provided with drainage holes 15, 16, arranged in two rows as shown, each row extending from a point approximating the location of an opening 12 nearly to the end of the side panels immediately adjacent.

At 17 is shown hot water flowing into the sink.

The operation of my device is as follows: In washing dishes the sink cover may be used as a shelf for the dishpan, which would then be near to the hot and cold water, thereby dispensing with the labor of carrying water from one part of the kitchen to another; the sink cover thus being a great convenience. The openings 12, because of their diamond shape, have a tendency to prevent undue splashing of water upon the sink cover. I have noticed that when a spigot of ordinary construction is operated so as to discharge water, there is a marked tendency of the water to spread out into a flat stream nearly always parallel with the general direction of the wall and, of course, more or less regular in shape. This being the case, the diamond shape of the openings permits the water to pass into the sink with a minimum of splashing upon the sink cover. If any water happens to accumulate upon the sink cover, however, the cover is tilted, as indicated by dotted lines in Fig. 2, the water then drifting toward the wall and passing through the openings 15, 16. These openings are so disposed relatively to the diamond - shaped openings 12 as to be most favorably situated for receiving such water as may accumulate in the sink cover. For instance, if a little water should splash when the spigot 13 is being used, such water would in all probability fall not far from the holes 16.

The sink cover above described also acts as a great saving to clothes which are often soiled with water that splashes from the bottom of the sink while the water is being drawn from the spigots. This fact alone would be appreciated by the housewife who frequently has to be her own kitchen maid.

The comparatively small cost of construction puts the sink cover within easy reach of the most economical housekeeper.

Having thus described my invention, I claim as new and desire to secure by Letters Patent:

1. A sink cover having generally the form of a shallow pan, the bottom of said pan being flat and provided with diamond-shaped openings placed corner to corner, and further provided with drainage holes smaller than said diamond-shaped openings.

2. A sink cover comprising a member of sheet material having generally the form of a shallow pan and provided with a flat bottom, said bottom being provided with a plurality of diamond-shaped openings placed corner to corner and located adjacent to one edge of said pan, said bottom being further provided with a plurality of drainage holes disposed intermediate said edge and said diamond-shaped openings.

3. The combination of a sink, a plurality of spigots located thereover, and a sink cover having generally the form of a pan and resting upon said sink, said sink cover being provided with two openings disposed below said spigot, said openings having their longest diameters in a plane crossing said spigots for the purpose of preventing water from said spigots from splashing upon said pan, said sink cover being further provided with drainage holes disposed adjacent to said openings but nearer than said openings to the adjacent edge of said cover.

In testimony whereof I have signed my name to this specification in the presence of two subscribing witnesses.

ADAM GIFFEN DEMAREST.

Witnesses:
WALTON HARRISON,
EVERARD B. MARSHALL.